United States Patent [19]

Fukuoka

[11] Patent Number: 4,514,083

[45] Date of Patent: Apr. 30, 1985

[54] DISTANCE MEASURING APPARATUS

[75] Inventor: Kenji Fukuoka, Fussa, Japan

[73] Assignee: Olympus Optical Company Ltd., Tokyo, Japan

[21] Appl. No.: 336,909

[22] Filed: Jan. 4, 1982

[30] Foreign Application Priority Data

Feb. 3, 1981 [JP] Japan .................................. 56-14700

[51] Int. Cl.³ .......................... G01C 3/10; G01B 11/26
[52] U.S. Cl. ........................................ 356/1; 354/403; 356/152
[58] Field of Search ................. 356/1, 141, 152; 354/25 A, 403

[56] References Cited

U.S. PATENT DOCUMENTS

| 3,320,424 | 5/1967 | Olson et al. | 356/141 |
| 3,458,704 | 7/1969 | Cath | 356/141 |
| 3,601,613 | 8/1971 | Hock | 356/141 |
| 4,313,654 | 2/1982 | Matsui et al. | 354/25 A |

FOREIGN PATENT DOCUMENTS 49-49625  5/1974  Japan .

*Primary Examiner*—S. C. Buczinski
*Attorney, Agent, or Firm*—Louis Weinstein

[57] ABSTRACT

A distance measuring apparatus projects a light beam toward an object whose distance is to be determined. Reflected light from the object is divided into a pair of light components by a beam splitter. The intensity of one of the light components is detected by first light intensity detector. The other light component is subject to an alteration in intensity in accordance with an angle formed between the illuminating light and the reflected light, and the intensity of the said other light component is detected by second light intensity detector. The outputs from both detector is fed to a circuit, which derives information indicative of a distance to the object being determined.

12 Claims, 4 Drawing Figures

DISTANCE MEASURING APPARATUS

BACKGROUND OF THE INVENTION

The invention relates to a distance measuring apparatus, and more particularly, to a distance measuring apparatus which projects a light beam toward an object to be determined and receives reflected light therefrom to determine the distance to the object.

An automatic focussing mechanism which may be used in a compact camera or the like generally comprises a distance measuring apparatus of the double image coincidence type which is based on the triangulation technique, and which is commonly referred to as a distance measuring apparatus of the so-called Viditronics type. A distance masuring apparatus of this type comprises a pair of arrays, each of which includes a plurality of photoelectric transducer elements and on which the image of an object being photographed is projected in accordance with the triangulation technique. A distance measurement is made in this arrangement, on the basis of determining the coincidence of double images in terms of a minimum sum of differential outputs from pairs of transducer elements, each pair being formed by two of the transducer elements from the two arrays which are located in a corresponding manner relative to each other.

However, a distance measuring apparatus of the Viditronics type suffers from the following disadvantages:

(1) An accurate determination of distance is not assured unless photoelectric conversion characteristics of both arrays are identical with each other as are the optical characteristics of incident paths of the light from an object being photographed which impinges upon both arrays, since the conversion outputs are then not balanced. However, it is very difficult to provide identical characteristics for both arrays or the related optics, resulting in an instability in the accuracy of the measurement achieved.

(2) The use of the triangulation technique requires a scan over distances from infinity to the closest point, which is usually performed by a rotation of a movable mirror. However, the resulting mechanism becomes complex, rendering it difficult to assure an increased reliability.

(3) The movable mirror is driven for rotation by the power charged during a film winding operation. Thus, it is necessary to provide a mechanism for interlocked movement with the film winding mechanism, adding to the complexity of the arrangement.

(4) The scan process comprises initially rotating the movable mirror from a start position corresponding to infinity to a terminal position corresponding to the closest point, during which rotation a point is detected where the sum of differential outputs from the transducer elements is at its minimum, followed by a reversed motion of the mirror to allow an interlocked movement of taking lens optics to the point where the minimum sum is obtained. Such a two step process is commonly employed, resulting in a time loss which is wasted from the distance measurement to the photographing operation. If an object being photographed happens to move during such measuring interval, the camera cannot be focussed upon the intended object. Accordingly, this approach does not lend itself to an advanced camera such as single lens reflex camera.

Distance measuring apparatus other than the Viditronics type is also known, which is again based upon the triangulation technique. In the triangulation technique, a distance to an object being photographed is determined from a base line across a pair of spaced points on the camera, which is very small as compared with the distance to the object. In other words, the determination is based on the detection of a change in a minimal angle formed when the object is subtended by the pair of points on the camera. It is difficult to provide an accurate measurement output corresponding to such a change in the minimal angle. Accordingly, the distance measuring apparatus involves complex signal detection and processing, requiring a complex arrangement of an increased precision which results in an expensive arrangement.

SUMMARY OF THE INVENTION

It is an object of the invention to avoid the described disadvantages of the prior art by providing a distance measuring apparatus which projects a light beam to an object being photographed or determined and receives reflected light therefrom and modulates the intensity thereof in accordance with the angle of incidence thereof so that an output representing a determined distance is derived as a function of the angle of incidence of reflected light.

It is another object of the invention to provide a distance measuring apparatus which modulates the intensity of reflected light from an object being determined by passing it through a critical angle prism.

The invention provides the following beneficial results:

(1) An accurate determination is enabled since an intensity modulated light output increases significantly even for a very small change in the angle of the reflected light from the object being determined.

(2) Distance information can be simply derived independently from the intensity of the light beam used for illumination or the reflectivity of the object being determined, by utilizing an output detecting the intensity of a first light component which is not subject to a modulation and another output detecting the intensity of a second light component which has been subjected to an intensity modulation.

(3) No moving parts are used, avoiding any degradation over a repeated use and increasing the reliability.

(4) Since moving parts are entirely avoided, the number of parts used as well as the number of assembly steps required are both reduced, providing an inexpensive arrangement.

(5) The absence of a mechanical interlocking assembly affords a greater freedom in its lay-out when implementing the invention into a camera, thus facilitating the design.

(6) Since the illuminating means and signal processor are completely separate from each other, the length of the base line on the camera can be considerably increased as compared with a conventional arrangement, and hence an improvement in the accuracy of measurement can be expected.

(7) A substantial improvement in the signal-to-noise ratio in the output can be achieved by the use of the illuminating light beam other than white light or a light beam having a definite dimension in a direction perpendicular to the base line.

DESCRIPTION OF PREFERRED EMBODIMENT

Figure 1:
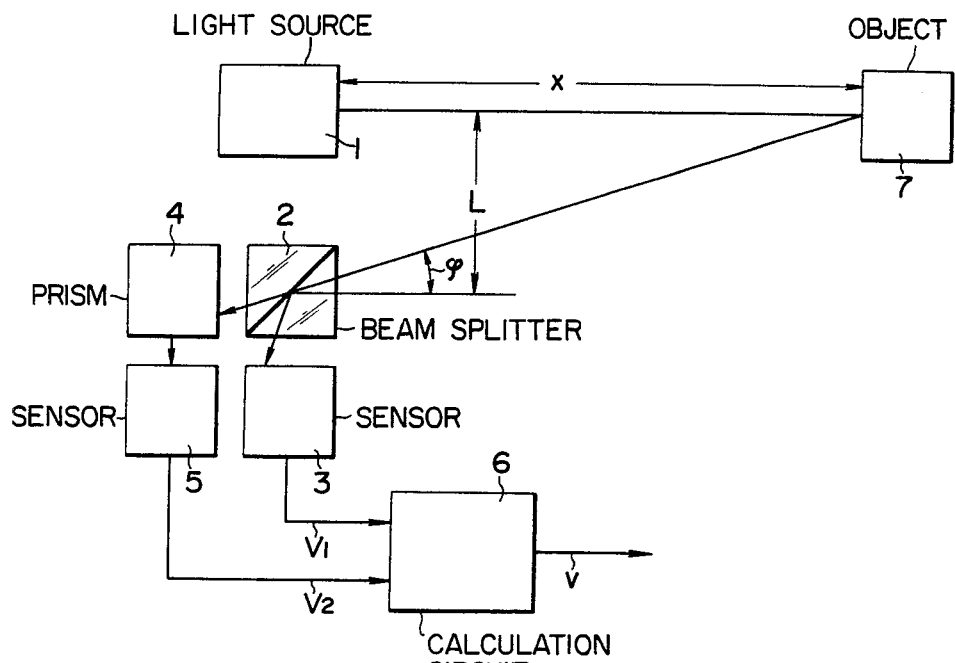
FIG. 1 is a block diagram of a distance measuring apparatus according to one embodiment of the invention.

Referring to FIG. 1, there is shown a distance measuring apparatus according to one embodiment of the invention. Illumination means 1 includes a collimator lens or the like which condenses light from a source such as a light emitting diode, semiconductor laser or the like into a thin collimated light beam, which is directed to an object 7 being photographed. Reflected light from the object 7 is caused to impinge upon beam splitting means 2 at an angle of $\phi$, which means is located at a distance L, representing the base line length, from the illumination means 1 in a direction perpendicular to the line joining the illumination means and the object, or the optical axis. A collimator optical system is normally disposed at the entrance to the beam splitting means 2, but is omitted from illustration to better illustrate the principle of the invention. The beam splitting means 2 may comprise, for example, a half-mirror, a beam splitter which is provided with half transmitting film, or a polarizing prism which diverts a light path in accordance with the direction of polarization.

A first light component which is obtained by the beam splitting means 2 is fed to first light intensity detecting means 3, which may comprise a combination of a photoelectric transducer element such as a photodiode and an amplifier to convert a light signal into a corresponding electrical signal. It is to be understood that an electrical signal output from the first light intensity detecting means 3 is proportional to the intensity of reflected light from the object 7 being photographed.

Unlike the first component, a second light component from the beam splitting means 2 is initially subject to a change in intensity by light intensity modulating means 4 before it impinges upon a second light intensity detecting means 5 for conversion into a corresponding electrical signal. The second light intensity detecting means 5 is constructed in a manner similar to the first light intensity detecting means 3.

It is to be noted that the light modulating means 4 operates in a manner different from that of a usual modulator. Specifically, a usual modulator would modulate a carrier, which is light here, in accordance with the magnitude of an electrical signal supplied as an input thereto. However, in the light modulating means 4, the intensity of the incident light is modulated in accordance with the angle which the incident light forms with the optical axis. In other words, the second light component is subject to an intensity modulation in accordance with the angle $\phi$ mentioned above.

The value of the angle $\phi$ is equal to 0° when the object 7 being photographed is located at infinity, and is equal to approximately 2° when the object 7 is located at a minimum distance, which is usually chosen to be 0.6 m, assuming the base line length L of 21 mm. Accordingly, it is desirable that the light modulating means 4 be constructed to provide a degree of modulation which is as high as possible within a limited extent of angle variation which is on the order of 2°.

Figure 2:
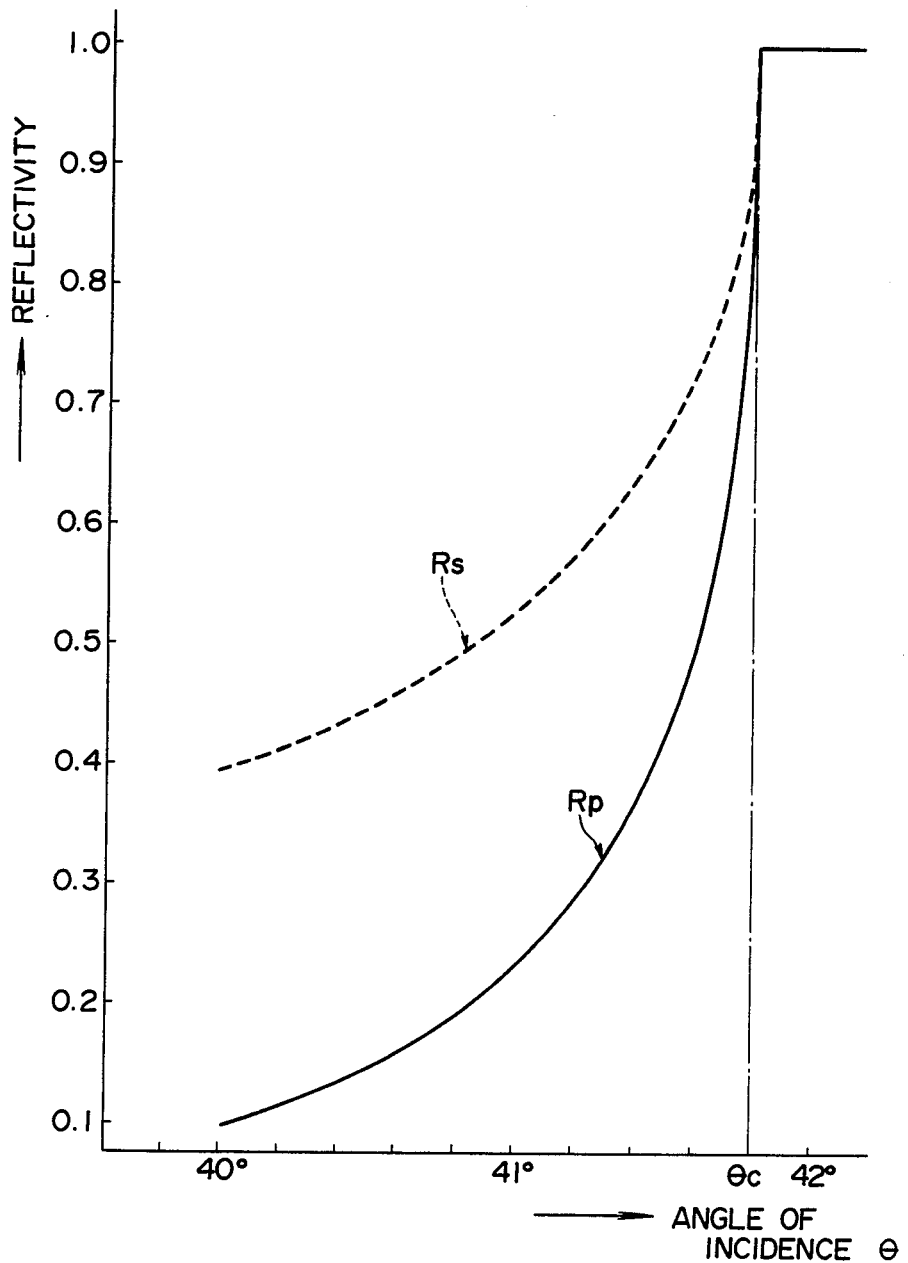
FIG. 2 graphically illustrates a change in the reflectivity in a region adjacent to the critical angle.

Such desirable characteristics can be obtained by the reflection occurring at the boundary between two media having different indices of refraction adjacent to the critical angle. Specifically, FIG. 2 graphically shows the reflectivity obtained at the boundary surface between a glass having a refractive index of 1.5 and air (having refractive index of 1) when the light passes from the glass layer into the air layer. Curve Rp represents the reflectivity of P-polarization and curve Rs that of S-polarization. As will be evident from FIG. 2, almost all of the incident light undergoes a refraction when the angle of incidence $\theta$ is small, presenting a reflectivity of a very small value. However, as the angle of incidence $\theta$ approaches the critical angle $\theta_c$ which is equal to 41.8°, the reflectivity increases very rapidly. In particular, the reflectivity undergoes a large variation over a change in the angle of incidence $\theta$ of approximately 2° adjacent to the critical angle $\theta_c$ for P-polarization. This meets with the above requirement. It will be seen that any desired value of the critical angle $\theta_c$ can be obtained by a suitable choice of the refractive indices of the media.

Figure 3:
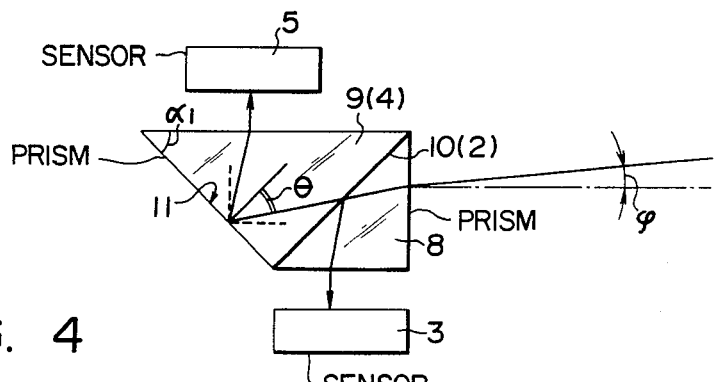
FIG. 3 is a detailed view, illustrating a specific example of the light modulating means shown in FIG. 1.
Figure 4:
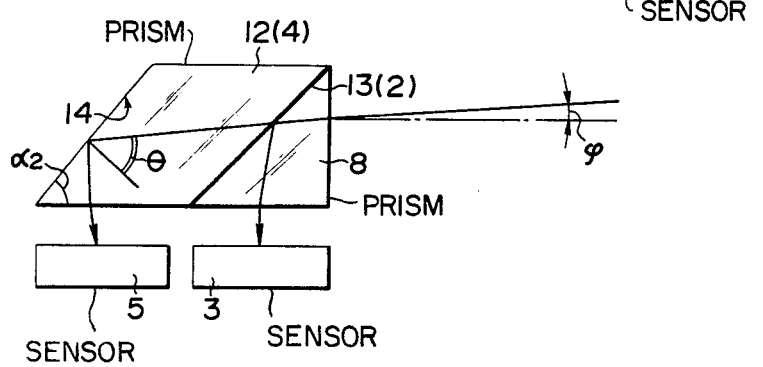
FIG. 4 is a schematic illustration of another specific example of the light modulating means shown in FIG. 1.

By utilizing a pair of prisms, the beam splitting means 2 and the light modulating means 4 can be formed in an integral manner as illustrated in FIG. 3 or 4. Specifically, in the arrangement of FIG. 3, a first prism 8 and a second prism 9 are joined together, with the joining surface 10 therebetween forming the beam splitting means 2. The second prism 9 is constructed as a critical angle prism functioning as the light modulating means 4. Part of the beam splitting means 2 which is defined by the prism joining surface 10 may be constructed as a half mirror or a polarizing prism as mentioned previously. Where a polarizing prism is employed, the S-polarization component is allowed to impinge upon the first light intensity detecting means 3 as the first light component while the P-polarization component is utilized as the second light component which impinges upon the second prism 9, functioning as the light modulating means 4. Where the first and the second prisms 8, 9 have an equal refractive index, the second light component proceeds in the same direction as the incident light upon the first prism 8 or the reflective light from the object 7. It is to be noted that when the second light component impinges upon the second prism 9 from the first prism 8, the angle of incidence which the second light component exhibits with respect to the reflecting surface 11 of the second prism 9, shown as an angle $\theta$, is very close to the critical angle $\theta_c$. Accordingly, the second light component is reflected by the reflecting surface 11 of the second prism 9 with an intensity which depends on the angle of incidence $\theta$ thereto, for incidence upon the second light intensity detecting means 5.

In the arrangement of FIG. 4, a second prism 12 which is substantially diamond shaped is joined to the first prism 8, defining a joining surface 13 therebetween through which the second light component impinges upon the reflecting surface 14 of the second prism 12 at an angle $\theta$ which is close to the critical angle. In this manner, the second light component is reflected with a light intensity which depends on the magnitude of the angle of incidence $\theta$. When emerging from the second prism 12, the second light component is directed in substantially the same direction as the light component emerging from the first prism 8, so that both light intensity detecting means 3, 5 can be disposed in a common plane. In the arrangements of FIGS. 3 and 4, in order to cause the angle of incidence $\theta$ upon the critical angle prism or the second prisms 9, 12, which function as light modulating means, to assume a value within a proper range such as from 39.8° to 41.8°, as illustrated for the response of FIG. 2, angles $\alpha_1$, $\alpha_2$ of the prisms 9, 12 should be such that $\alpha_1 < \alpha_2$.

Thus it will be seen that an electrical signal output from the second light intensity detecting means 5 carries information relating to the angle $\phi$. Obviously, this output is also influenced by the intensity of illuminating light from the illumination means 1, the attenuation caused by diffusion of the light, the reflectivity of an object being photographed or the like, but such influences can be simply eliminated by utilizing an output from the first light intensity detecting means 3.

Specifically, representing the output from the first detecting means 3 by $V_1$ and the output from the second detecting means 5 by $V_2$, these outputs can be expressed as follows:

$$V_1 = \eta_1 rI$$

$$V_2 = f(\phi)\eta_2 rI$$

where I represents the intensity of illuminating light, and r a constant which is determined by the diffusion of light and the reflectivity of an object being photographed. Thus rI represents the intensity of light reflected by the object being photographed. $\eta_1$ and $\eta_2$ represent constants which represent the proportions of the first and the second light component formed by the beam splitting means 2. $f(\phi)$ represents a function which defines the intensity modulation characteristic of the light modulating means 4 in accordance with the angle $\phi$.

The outputs $V_1$ and $V_2$ from the detecting means 3, 5 are applied to calculation means 6, which derives a variable $v = V_2/V_1$. By using a factor $k = \eta_2/\eta_1$, which is a constant, the output v from the calculation means 6 can be expressed as follows:

$$v = kf(\phi)$$

Since the angle $\phi$ is a function of the distance x to the object being photographed, the output v is independent from the intensity of illuminating light, the attenuation by the diffusion of light, the reflectivity of the object being photographed and the like, but is solely a function of the distance x to the object being photographed. In other words, $$v = g(x)$$

In this manner, the output v from the calculation means 6 is derived as a function of the distance x. The ratio of the outputs $V_1$ and $V_2$ can be calculated in the calculation means 6, for example, by providing a logarithmic compression of the outputs $V_1$ and $V_2$, followed by a differential amplification thereof to derive a ratio, the logarithm of which is obtained. Alternatively, the outputs $V_1$ and $V_2$ may be initially subjected to an analog-digital conversion before they are processed in a digital manner.

The output v which is derived by the calculation means 6 as a function of only the distance x can be utilized in various manners. If required, a linearizing correction may be applied to this output before it is used in an ammeter to provide a display of the distance. Alternatively, the output level may be subdivided into a plurality of zones, each of which is connected to a separate one of a plurality of light emitting diodes, thus enabling a display of different distance zones. Additionally, the output v may be initially subjected to an analog-to-digital conversion to provide a numerical or digital display. Finally, the output may be utilized to drive a lens assembly in order to achieve an automatic focussing operation.

It should be understood that the invention is not limited to the specific details of the embodiments mentioned above, but that a number of known signal processing techniques may be used. By way of example, infrared radiation may be used as illuminating light in order to improve the signal-to-noise ratio for avoiding adverse influences of natural light. A color filter may be used on the light receiving side. In addition, the illuminating light may be modulated by a given frequency so that the corresponding frequency component can be selectively amplified on the receiving side.

As a further alternative, in place of utilizing a single light beam of a reduced diameter for the illuminating light, the beam may have a definite dimension in a direction perpendicular to the base line or perpendicular to the plane of FIG. 1. In this instance, the light energy resulting from the reflection from the object 7 being photographed and incident upon the receiver assembly can be increased, thus contributing to an improvement of the signal-to-noise ratio.

What is claimed is:
1. A distance measuring apparatus comprising:

illumination means for projecting a collimated light beam of a reduced cross sectional area toward an object whose distance is being determined along an optical axis;

beam splitting means disposed at a given distance from the illumination means in a direction perpendicular to the optical axis therefor for receiving collimated light reflected from the object and for splitting the received light into a first and a second light component;

first light detecting means for generating a first signal representing the intensity of the first light component from the beam splitting means;

optical conversion means having a predetermined index of refraction and having at least one surface defining a boundary with an adjacent media having a different index of refraction, said optical conversion means receiving the second light component from the beam splitting means, said second light component impinging on said one surface at an angle of incidence near its critical angle, said optical conversion means altering the intensity of the second light component by reflection at said surface, said second light component exiting from said optical conversion means with an intensity which is a function of the angle formed between the optical axis and the direction in which the reflected light impinges upon the beam splitting means from the object;

second light detecting means for generating a second signal representing the intensity of the second light component as outputted by the conversion means; and calculation means responsive to said first and second signals for calculating the distance to the object.

2. A distance measuring apparatus according to claim 1 in which the light beam projected by the illumination means comprises a collimated beam having a definite dimension in a direction perpendicular to a base line defined by a line joining the illumination means and the beam splitting means.

3. A distance measuring apparatus according to claim 1 in which the beam splitting means comprises a half transmitting member such as a half mirror, a half transmitting film or the like.

4. A distance measuring apparatus according to claim 1 in which the beam splitting means is formed by a polarizing prism and in which the S-polarization component forms the first light component and the P-polarization component forms the second light component.

5. A distance measuring apparatus according to claim 1 in which each of the first and the second light intensity detecting means is formed by an electrical circuit including a photoelectric transducer element and an amplifier.

6. A distance measuring apparatus according to claim 1 in which the converting means comprises a prism wherein said surface is a reflecting surface, the prism being constructed and arranged such that an angle of incidence upon the reflecting surface is close to a critical angle.

7. A distance measuring apparatus according to claim 6 in which a triangular prism is joined to the critical angle prism, with a joining surface therebetween defining the beam splitting means.

8. A distance measuring apparatus according to claim 7 in which the critical angle prism is formed by a triangular prism and in which the second light component whose intensity has been altered emerges therefrom in a direction opposite from the direction in which the first light component emerges from the prism.

9. A distance measuring apparatus according to claim 7 in which the critical angle prism comprises a substantially diamond-shaped prism and in which the second light component, whose intensity has been altered, emerges therefrom in a direction which is parallel to the direction in which the first light component emerges from prism.

10. A distance measuring apparatus according to claim 1 in which the calculation means includes means for calculating a ratio employing the output signals from the first and the second light detecting means, thereby deriving a distance.

11. A method of measuring distance between a measuring position and an object comprising the steps of:

projecting a collimated light beam from the measuring position toward the object whose distance is to be determined along an optical axis;

receiving reflected light from said object and splitting it into a first and a second light component by utilizing beam splitting means;

determining the intensity of said first light component emerging from said beam splitting means;

positioning a prism having at least one reflecting surface so that said second light component impinges upon said one reflecting surface at an angle of incidence close to its critical angle;

determining the intensity of the second light component exiting said prism after reflection from said surface, the intensity of second light component being altered as a function of the angle related to the distance between an object and the distance measuring apparatus;

calculating the distance to the object to be determined as a function of said angle related to the distance between an object and the distance measuring apparatus in response to the intensity of said first light component emitted from the beam splitting means and the altered second light component emitted by the prism.

12. A distance measuring apparatus for measuring the distance to an object, comprising:

illumination means for projecting a light beam along an optical axis toward the object;

beam splitting means disposed in relation to said object for receiving light reflected therefrom and for splitting said reflected light into a first light component and a second light component;

first light intensity detecting means for producing an output responsive to the intensity of said first light component derived from said beam splitting means;

light intensity altering means for receiving said second light component from said beam splitting means and for altering the intensity of said second light component as a function of the angle of incidence the second light component forms with a surface of the altering means, said angle being close to the critical angle at said surface and being related to another angle formed between said optical axis and an imaginary line representing the direction in which said reflected light impinges upon said beam splitting means;

second light intensity detecting means for generating an output responsive to the intensity of said second light component after it is received from said light modulating means; and calculation means responsive to the outputs from said first and second light intensity detecting means for calculating the distance to said object.

* * * * *